(12) United States Patent
Hrabak et al.

(10) Patent No.: US 8,660,549 B2
(45) Date of Patent: Feb. 25, 2014

(54) AVOIDING BATTERY DEPLETION OF A MOBILE DEVICE

(75) Inventors: Robert A. Hrabak, West Bloomfield, MI (US); James J. Piwowarski, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 13/455,524

(22) Filed: Apr. 25, 2012

(65) Prior Publication Data

US 2013/0288659 A1 Oct. 31, 2013

(51) Int. Cl.
*H04M 3/00* (2006.01)

(52) U.S. Cl.
USPC .............................. 455/419; 455/445; 370/311

(58) Field of Classification Search
USPC ........ 455/405, 412.1, 414.1–414.3, 418–420, 455/423–425, 466, 556.1–556.2, 572–574
See application file for complete search history.

(56) References Cited

U.S. PATENT DOCUMENTS

| 2003/0100308 | A1* | 5/2003 | Rusch | 455/445 |
| 2011/0261704 | A1* | 10/2011 | Etemad | 370/252 |
| 2011/0268000 | A1* | 11/2011 | Kashikar et al. | 370/311 |

\* cited by examiner

*Primary Examiner* — Kashif Siddiqui
(74) *Attorney, Agent, or Firm* — Anthony Luke Simon; Reising Ethington P.C.

(57) ABSTRACT

A method of regulating the battery usage of a wireless device includes receiving information indicating the battery charge level of a wireless device over a first wireless communication channel using a short-range wireless communication protocol; choosing a wireless communication protocol for use by the wireless device with a second wireless communication channel based on the received battery charge level information; constructing a message instructing the wireless device to use the chosen wireless communication protocol for communications via the second wireless communication channel; and sending the message from a vehicle telematics unit to the wireless device.

20 Claims, 2 Drawing Sheets

AVOIDING BATTERY DEPLETION OF A MOBILE DEVICE

TECHNICAL FIELD

The present invention relates generally to wireless devices and more particularly to the battery depletion of wireless devices.

BACKGROUND

Vehicles manufacturers today often equip vehicles with some form of telematics device that is integrated with the vehicle. Telematics devices can carry out a number of vehicle-related functions, such as enabling communications to and from the vehicle or determining vehicle position. While in the past the telematics device may have been a vehicle occupant's sole means of wireless communication, this is no longer the case. Many vehicle occupants now carry handheld wireless devices that have communication capabilities similar to those of the telematics device. Even though the telematics device carried by the vehicle and the handheld wireless device can each carry out wireless communications, there are some benefits to coordinating the telematics device and the handheld wireless device, such as through a communications link between them. In one example, the vehicle occupant can wirelessly link the handheld wireless device to the telematics device. By doing so, the vehicle occupant can place a call using the handheld wireless device yet speak and listen using an in-vehicle audio system. However, apart from carrying out telephone calls over the wireless link, little other coordination or cooperation occurs between the telematics device and the handheld wireless device.

SUMMARY

According to an aspect of the disclosure, there is provided a method of regulating the battery usage of a wireless device. The method includes receiving information indicating the battery charge level of a wireless device over a first wireless communication channel using a short-range wireless communication protocol; choosing a wireless communication protocol for use by the wireless device with a second wireless communication channel based on the received battery charge level information; constructing a message instructing the wireless device to use the chosen wireless communication protocol for communications via the second wireless communication channel; and sending the message from a vehicle telematics unit to the wireless device.

According to another aspect of the disclosure, there is provided a method of regulating the battery usage of a wireless device. The method includes establishing a first wireless communication channel between a wireless device and a vehicle telematics unit using a first wireless communication protocol; establishing a second wireless communication channel at the wireless device using a second wireless communication protocol; sending the battery charge level of the wireless device from the wireless device to the vehicle telematics unit via the first wireless communication channel using the first wireless communication protocol; receiving a message from the vehicle telematics unit via the first wireless communication channel using the first wireless communication protocol, wherein the message includes an instruction to begin using a new second wireless communication protocol based on the battery charge level of the wireless device sent; and beginning the use of the new second wireless protocol with the second wireless communication channel at the wireless device based on the received message.

According to yet another aspect of the disclosure, there is provided a method of regulating the battery usage of a wireless device. The method includes establishing a first wireless communication channel between a wireless device and a vehicle telematics unit via a first wireless communication protocol using Bluetooth; receiving data at the vehicle telematics unit from the wireless device over the first short-range wireless communication channel indicating the battery charge level of the wireless device; determining a second wireless communication protocol to be used by the wireless device for communication over a second short-range wireless communication channel based on the received data; constructing a message that includes the determined second wireless communication protocol and that is used to control the second wireless communication protocol used by the wireless device for communications over the second short-range wireless communication channel; and sending the message from the vehicle telematics unit to the wireless device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
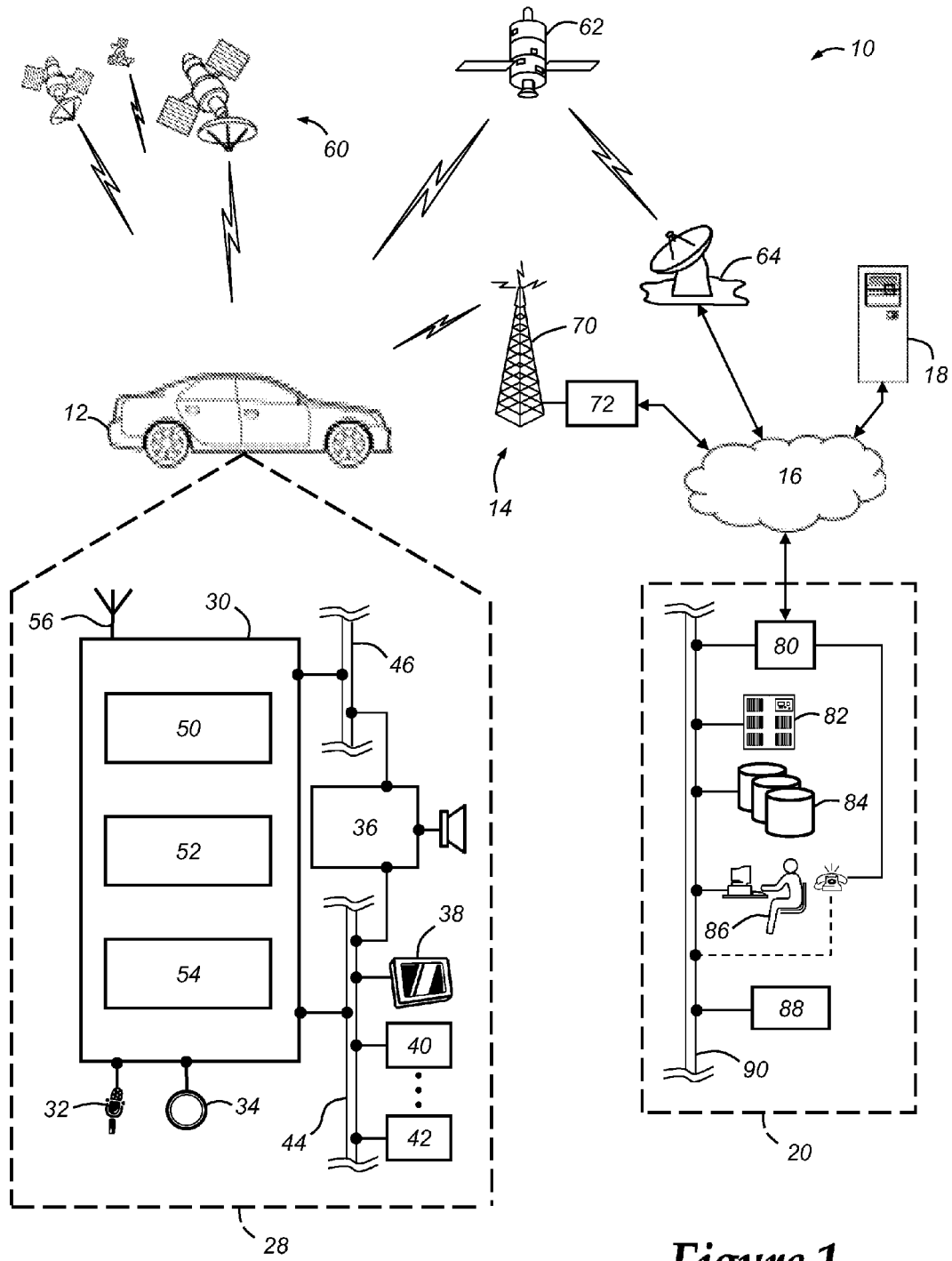
FIG. 1 is a block diagram depicting an exemplary embodiment of a communications system that is capable of utilizing the method disclosed herein.

The method described below regulates the battery usage of a wireless device by controlling wireless protocols used by the wireless device. When the wireless device, such as a smart phone, is wirelessly linked with a vehicle telematics unit having short-range wireless communications capabilities, the wireless device can be directed to change its wireless communication protocol depending on its battery usage. In general, the vehicle telematics unit can use a first short-range wireless communication channel to communicate between the vehicle telematics unit and the wireless device. This first short-range wireless communication channel can be established using Bluetooth, for example. In addition, the wireless device may separately establish a second wireless communication channel using one of many wireless protocols. The second wireless communication channel can be a wireless connection to a WiFi local area network (LAN) or can include a wireless connection between the wireless device and a base transceiver station (e.g. a cell tower), such as is used to carry out communications in a cellular system. Using the first short-range wireless communication channel between the vehicle telematics unit and the wireless device, the wireless device can send its battery usage data to the vehicle telematics unit.

Depending on the battery charge level and/or the calculated battery charge level rate of change, the vehicle telematics unit can determine if the battery usage is above/below one or more predetermined thresholds, and based on that determination direct the wireless device to change the wireless protocol it uses to communicate over the second wireless communication channel. For example, if the battery charge level is above a predetermined threshold, the vehicle telematics unit can direct the wireless device to maintain the use of a wireless protocol with the second wireless communication channel that may consume relatively high amounts of power relative to other possible wireless protocols. In contrast, if the battery usage is determined to be above a predetermined threshold, the vehicle telematics unit can direct the wireless device to change the wireless protocol used on the second wireless communication channel to one that consumes less power than the wireless protocol it had previously been using. By regulating the wireless protocol used over the second wireless communication channel, the wireless device can conserve energy thereby extending its battery life and the amount of time the wireless device remains operational. And while the present disclosure describes the vehicle telematics unit directing wireless protocol changes, it is also possible to direct such changes using something other than the vehicle telematics unit, such as a personal computer (PC) having short-range wireless communications capabilities. That is, in some cases a vehicle telematics unit can be substituted with the PC. An example of this is when the wireless device is "tethered" to the PC over the first short-range wireless communications channel while also connected to a base transceiver station or WiFi LAN using the second wireless communications channel.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a smart phone 57. The smart phone 57 is one example of a wireless device that can be used with the system/method disclosed herein and can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Android™ manufactured by Motorola, Inc. While the smart phone 57 may also include the ability to communicate via cellular communications using the wireless carrier system 14, this is not always the case. For instance, Apple manufactures devices such as the iPad™, iPad 2, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of smart phone 57 for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
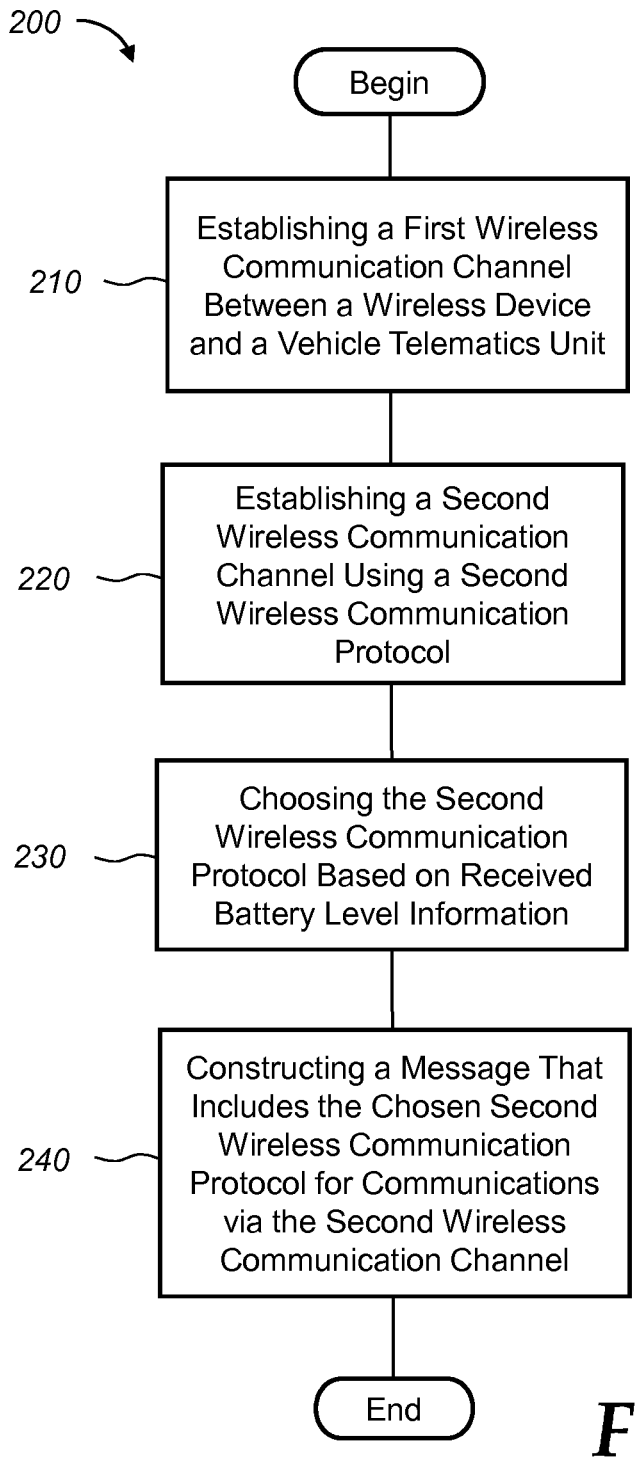
FIG. 2 is a flow chart depicting a method of regulating the battery usage of a wireless device in communication with a vehicle.

Turning now to FIG. 2, there is shown a method 200 of regulating the battery usage of a wireless device. The method 200 begins at step 210 by establishing a first wireless communication channel between the wireless device and the vehicle telematics unit 30 using a first wireless communication protocol. The first wireless communication channel can be described as a short-range wireless communication channel between the wireless device, such as the smart phone 57, and another device having short-range wireless communications capabilities, such as the vehicle telematics unit 30 or a personal computer (PC). The following implementation will be described in terms of the smart phone 57 as the wireless device and the vehicle telematics unit 30 as what the wireless device forms the first wireless communication channel with. However, it should be noted that the vehicle telematics unit 30 in the following description should be viewed as being interchangeable with the PC. As noted above, the first wireless communication channel can be established using a Bluetooth wireless connection. Using the Bluetooth connection, information/data that indicates the battery charge level of the smart phone 57 can be communicated over the first wireless communication channel. This information can also include the battery charge level rate of change or the rate of change can be calculated at the vehicle telematics unit 30 using the battery charge level. With respect to Bluetooth, it is possible to establish the first wireless communication channel using the Bluetooth Low Energy (BLE) feature of Bluetooth version 4.0. Other short-range wireless communication protocols can be used, but the method 200 will be described in terms of using Bluetooth to carry out the first wireless communication channel. The method 200 proceeds to step 220.

At step 220, a second wireless communication channel is established at the smart phone 57 using a second wireless communication protocol. Apart from the first wireless communication channel, a separate wireless communication channel can also be used. Once the Bluetooth connection between the vehicle telematics unit 30 and the smart phone 57 is established during step 210, another wireless communication channel can be set up with the smart phone 57. In one implementation, the second wireless communication channel can be a short-range wireless communication link between the smart phone 57 and a WiFi local area network (LAN) or a wireless local area network (WLAN). WiFi LANs or WLANs usually communicate using one of the IEEE 802.11 short-range wireless communications protocols, such as 802.11(a), 802.11(b), 802.11(g), and 802.11(n), and the smart phone 57 can often choose which of these second wireless communication protocols it will use. Each of these lettered 802.11 protocols uses a different amount of power to implement and depending on that relative amount of power, the second wireless communication protocol can be chosen. In another implementation, the second wireless communication channel can include a cellular communication channel between the smart phone 57 and a base transceiver station (e.g. cell tower 70), such as the type used to register with base transceiver stations or to carry out cellular communications. And various cellular/mobile phone protocols/standards can be described as second wireless communication protocols for carrying out cellular communications. The cellular/mobile phone protocols can include CDMA or GSM cellular standards as well as the 2G, 3G, and 4G/LTE generations of one or more of these cellular standards. Regardless of whether the smart phone 57 establishes the second wireless communication channel between the WiFi LAN/WLAN or the base transceiver station, the smart phone 57 can communicate the identity of the second wireless communication protocol to the vehicle telematics unit 30 via the first wireless communication channel. The method 200 proceeds to step 230.

At step 230, the second wireless communication protocol can be chosen based on the received battery charge level information. Using the information/data received over the first wireless communication channel indicating the battery charge level of the smart phone 57, the second wireless communication protocol can be chosen. The vehicle telematics unit 30 can use the received battery charge level information to calculate the rate of battery consumption of the smart phone 57 over a period of time. The battery consumption and/or the battery charge level can then be used to determine if the second wireless communication protocol presently used by the smart phone 57 should remain the same or change. For example, if the smart phone 57 communicates with the vehicle telematics unit 30 over the first wireless communication channel using Bluetooth and with the WiFi LAN using the second wireless communication channel/protocol, the vehicle telematics unit 30 can receive a message over the first wireless communication channel informing the unit 30 that the second wireless communication protocol is 802.11(g). The vehicle telematics unit 30 can then compare the identity of the second communication protocol (in this case 802.11 (g)), with a number of predefined battery charge level thresholds, such as predetermined battery charge level values or rate of battery charge level change values. If the battery charge level of the smart phone 57 rises above the predetermined battery charge level threshold or the rate of battery charge level change falls below the predetermined battery charge level rate of change threshold, the vehicle telematics unit 30 can decide that the smart phone 57 should continue using 802.11(g) or possibly begin using a different wireless protocol that may use more energy, such as 802.11(n). However, if the battery charge level of the smart phone 57 falls below the predetermined battery charge level threshold or the rate of battery charge level change rises above the predetermined battery charge level rate of change threshold, the vehicle telematics unit 30 can decide that the smart phone 57 should stop using 802.11(g) and begin using a different wireless protocol that may use less energy, such as 802.11(a).

In another example, the smart phone 57 can communicate with the vehicle telematics unit 30 over the first wireless communication channel using Bluetooth and with the base transceiver station using the second wireless communication channel/protocol. The vehicle telematics unit 30 can receive a message over the first wireless communication channel informing the unit 30 that the second wireless communication protocol is 4G/LTE CDMA. The vehicle telematics unit 30 can then compare the identity of the second communication protocol (in this case 4G/LTE CDMA, such as can be provided by VerizonWireless), with a number of predefined battery level thresholds, such as predetermined battery charge level values or rate of battery charge level change values. If the battery charge level of the smart phone 57 rises above and/or the rate of battery charge level change falls below the predefined thresholds, the vehicle telematics unit 30 can decide that the smart phone 57 should continue using 4G/LTE CDMA. However, if the battery charge level of the smart phone 57 falls below and/or the rate of battery charge level change of the smart phone 57 rises above the thresholds, the vehicle telematics unit 30 can decide that the smart phone 57 should stop using 4G/LTE CDMA and begin using a different wireless protocol that may use less energy, such as 3G CDMA.

The predetermined battery charge level and/or the predetermined rate of battery charge level change thresholds can be specified for each wireless communication protocol or the thresholds can be more general. In the more general case, the vehicle telematics unit 30 may not know the identity of the second wireless protocol but nonetheless direct the smart phone 57 to change the second wireless protocol if the battery charge level and/or the battery charge level rate of change rise above or fall below a predetermined threshold/level. The method 200 proceeds to step 240.

At step 240, a message is constructed that instructs the smart phone 57 to use the chosen wireless communication protocol for communications via the second wireless communication channel. If the vehicle telematics unit 30 determines that no change in the second wireless communication protocol is necessary, then step 240 may be skipped. However, if the vehicle telematics unit 30 determines that the smart phone 57 should begin using a new second wireless communication protocol, then a message that includes a computer-readable instruction for changing wireless communication protocols can be sent from the vehicle telematics unit 30 to the smart phone 57. The use of the new second wireless protocol with the second wireless communication channel can begin at the smart phone 57 based on the received message. The message from the vehicle telematics unit 30 can be sent via the first wireless communication channel using Bluetooth or another short-range wireless protocol. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating the battery usage of a wireless device, comprising the steps of:

(a) receiving information indicating the battery charge level of a wireless device over a first wireless communication channel using a short-range wireless communication protocol;
(b) choosing a wireless communication protocol for use by the wireless device with a second wireless communication channel based on the received battery charge level information;
(c) constructing a message instructing the wireless device to use the chosen wireless communication protocol for communications via the second wireless communication channel; and
(d) sending the message from a vehicle telematics unit to the wireless device.

2. The method of claim 1, further comprising the step of implementing a smart phone as the wireless device.

3. The method of claim 1, further comprising the step of establishing the second wireless communication channel between the wireless device and a base transceiver station using a cellular communication channel.

4. The method of claim 1, further comprising the step of calculating a rate of battery charge level change.

5. The method of claim 1, further comprising the step of establishing the first wireless communication channel and the second wireless communication channel using short-range wireless communication protocols.

6. The method of claim 1, further comprising the step of communicating over the first wireless communication channel using Bluetooth.

7. The method of claim 6, further comprising the step of communicating over the first wireless communication channel using the Bluetooth Low Energy feature of Bluetooth.

8. A method of regulating the battery usage of a wireless device, comprising the steps of:
(a) establishing a first wireless communication channel between a wireless device and a vehicle telematics unit using a first wireless communication protocol;
(b) establishing a second wireless communication channel at the wireless device using a second wireless communication protocol;
(c) sending the battery charge level of the wireless device from the wireless device to the vehicle telematics unit via the first wireless communication channel using the first wireless communication protocol;
(d) receiving a message from the vehicle telematics unit via the first wireless communication channel using the first wireless communication protocol, wherein the message includes an instruction to begin using a new second wireless communication protocol based on the battery charge level of the wireless device sent in step (c); and
(e) beginning the use of the new second wireless protocol with the second wireless communication channel at the wireless device based on the received message.

9. The method of claim 8, further comprising the step of implementing a smart phone as the wireless device.

10. The method of claim 8, further comprising the step of establishing the second wireless communication channel between the wireless device and a base transceiver station using a cellular communication channel.

11. The method of claim 8, further comprising the step of calculating a rate of battery charge level change.

12. The method of claim 8, further comprising the step of establishing the first wireless communication channel and the second wireless communication channel using short-range wireless communication protocols.

13. The method of claim 8, further comprising the step of communicating over the first wireless communication channel using Bluetooth.

14. The method of claim 13, further comprising the step of communicating over the first wireless communication channel using the Bluetooth Low Energy feature of Bluetooth.

15. A method of regulating the battery usage of a wireless device, comprising the steps of:
(a) establishing a first wireless communication channel between a wireless device and a vehicle telematics unit via a first wireless communication protocol using Bluetooth;
(b) receiving data at the vehicle telematics unit from the wireless device over the first short-range wireless communication channel indicating the battery charge level of the wireless device;
(c) determining a second wireless communication protocol to be used by the wireless device for communication over a second short-range communication channel based on the data received in step (b);
(d) constructing a message that includes the determined second wireless communication protocol and that is used to control the second wireless communication protocol used by the wireless device for communications over the second short-range communication channel; and
(e) sending the message from the vehicle telematics unit to the wireless device.

16. The method of claim 15, further comprising the step of implementing a smart phone as the wireless device.

17. The method of claim 15, further comprising the step of establishing the second wireless communication channel between the wireless device and a base transceiver station using a cellular communication channel.

18. The method of claim 15, further comprising the step of calculating a rate of battery charge level change.

19. The method of claim 15, further comprising the step of establishing the first wireless communication channel and the second wireless communication channel using short-range wireless communication protocols.

20. The method of claim 19, further comprising the step of establishing the second wireless communication channel between the wireless device and a WiFi local area network (LAN).

* * * * *